US012646875B2

(12) United States Patent
Wild et al.

(10) Patent No.: US 12,646,875 B2
(45) Date of Patent: Jun. 2, 2026

(54) COUPLING ARRANGEMENT FOR COUPLING A TERMINAL CONNECTOR TO A CIRCUIT BOARD ARRANGEMENT

(71) Applicant: Tridonic GmbH & Co KG, Dornbirn (AT)

(72) Inventors: Emanuel Wild, Lustenau (AT); David Wainowski, Lochau (AT)

(73) Assignee: Tridonic GmbH & Co KG, Dornbirn (AT)

( * ) Notice: Subject to any disclaimer, the term of this patent is extended or adjusted under 35 U.S.C. 154(b) by 290 days.

(21) Appl. No.: 18/559,884

(22) PCT Filed: May 6, 2022

(86) PCT No.: PCT/EP2022/062334
§ 371 (c)(1),
(2) Date: Nov. 9, 2023

(87) PCT Pub. No.: WO2022/238262
PCT Pub. Date: Nov. 17, 2022

(65) Prior Publication Data

US 2024/0243501 A1 Jul. 18, 2024

(30) Foreign Application Priority Data

May 12, 2021 (EP) .................................... 21173532

(51) Int. Cl.

| | |
|---|---|
| ***H01R 4/48*** | (2006.01) |
| ***H01R 12/72*** | (2011.01) |
| ***H01R 13/627*** | (2006.01) |

(52) U.S. Cl.
CPC ......... *H01R 12/724* (2013.01); *H01R 4/4821* (2023.08); *H01R 13/6271* (2013.01); *H01R 4/483* (2023.08)

(58) Field of Classification Search
CPC ........................... H01R 12/724; H01R 4/4821; H01R 13/6271; H01R 4/483
(Continued)

(56) References Cited

U.S. PATENT DOCUMENTS

| | | | | |
|---|---|---|---|---|
| 3,493,916 A * | 2/1970 | Wallace | H01R 12/716 | 439/79 |
| 6,030,246 A * | 2/2000 | Kunishi | H01R 12/592 | 439/495 |

(Continued)

FOREIGN PATENT DOCUMENTS

| | | |
|---|---|---|
| CN | 107017533 A | 8/2017 |
| DE | 19710306 A1 | 8/1998 |

(Continued)

OTHER PUBLICATIONS

PCT/EP2022/062334, International Search Report and Written Opinion dated Aug. 15, 2022, 9 pages.

*Primary Examiner* — Tulsidas C Patel
(74) *Attorney, Agent, or Firm* — Andrus Intellectual Property Law, LLP

(57) ABSTRACT

A coupling arrangement 10 for reversibly mechanically and electrically coupling a terminal connector 200 to a circuit board arrangement 100 comprising, the circuit board arrangement 100, which contains a circuit board 110 and a connecting element 120 being mechanically connected to the circuit board 110. Hereby the connecting element 120 comprises at least one connecting unit 121, wherein each connecting unit 121 comprises a first electrical connection point 124 being electrically connected to the circuit board 110. Moreover, the coupling arrangement further contains the terminal connector 200 comprising at least one terminal connector unit 210 and a housing 205 for carrying the at least one terminal connector unit 210. In a mechanical connection state of the terminal connector 200 and the
(Continued)

circuit board arrangement 100, the respective terminal connector units 210 and connecting units 121 are coupled, providing an electrical connection of the terminal connector 200 and the circuit board 110.

16 Claims, 2 Drawing Sheets

(58) Field of Classification Search
USPC .............................................................. 439/55
See application file for complete search history.

(56) References Cited

U.S. PATENT DOCUMENTS

2020/0343669 A1 10/2020 Ishikawa et al.
2025/0183564 A1 * 6/2025 Reibke ..................... H01R 9/24

FOREIGN PATENT DOCUMENTS

EP 0735616 A2 10/1996
EP 4089844 A1 * 11/2022 ........... H01R 12/724

* cited by examiner

COUPLING ARRANGEMENT FOR COUPLING A TERMINAL CONNECTOR TO A CIRCUIT BOARD ARRANGEMENT

CROSS REFERENCE TO RELATED APPLICATIONS

The present application is the U.S. national stage application of international application PCT/EP2022/062334 filed May 6, 2022, which international application was published on Nov. 17, 2022 as International Publication WO 2022/238262 A1. The international application claims priority to European Patent Application No. 21173532.9 filed May 12, 2021.

BACKGROUND AND SUMMARY OF THE INVENTION

The invention relates to a coupling arrangement for reversibly coupling a terminal connector to a circuit board, whereby the terminal connector comprises at least one terminal connector unit having a plurality of terminals for electrically connecting external connectors to the circuit board, respectively.

Usually, the terminal connector comprises at least one or a plurality of terminal connector units each designed to allow for an electrical coupling via a plurality of (e.g. three) different terminals. The terminal connector unit(s) is/are provided as a composite terminal box. Preferably, the terminal connector respectively each terminal connector unit is a standardized terminal connector to form a standard terminal box, like a LINECT terminal box. Through such a terminal box, external connectors of different types (e.g. wires, plug-in connectors, etc.) can be electrically connected to a circuit board. Therefore, each terminal unit is electrically connectable to a circuit board—e.g. a circuit board of an LED driver—requires additional wiring and devices.

It is thus an object of the present invention to provide a terminal connector and a circuit board as mentioned, which can be electrically connected in an easy, compact and cost-efficient manner.

This object is solved by a coupling arrangement according to independent claim 1. Particular embodiments of the invention are disclosed in the dependent claims.

According to an aspect, the present invention provides a coupling arrangement for reversibly mechanically and electrically coupling a terminal connector to a circuit board arrangement. The coupling arrangement hereby comprises the circuit board arrangement, which in turn comprises a circuit board; and a connecting element being mechanically connected to the circuit board, wherein the connecting element comprises at least one connecting unit, wherein each connecting unit comprises a first electrical connection point being electrically connected to the circuit board. Moreover, the coupling arrangement comprises the terminal connector, which includes at least one terminal connector unit and a housing for carrying the at least one terminal connector unit, wherein each terminal connector unit comprises a first terminal having a first conductor connection point for electrically connecting a first conductor (i.e. a first external conductor), a second terminal having a second conductor connection point for electrically connecting a second conductor (i.e. a second external conductor); and a third terminal being electrically connected to the first and second terminal. The third terminal comprises a second electrical connection point designed for being electrically connectable to at least one first electrical connection point in a connection direction. Furthermore, the circuit board arrangement comprises first connection structures and the terminal connector comprises complementary second connection structures for a reversible mechanical connection of the circuit board arrangement and the terminal connector, wherein, in the mechanical connection state, the first and second terminals are electrically connected to the circuit board through the first and second electrical connection point.

As the terminal connector is directly mechanically connected to the circuit board, a compact layout and easy handling of these components can be obtained. Also, additional parts like wiring between these components can be avoided, thus reducing the number of required parts and facilitating the assembly, which in turn results in a cost reduction. Omitting wiring between these components also results in omitting a need of a corresponding strain relief, which is integrally taken by the mechanical connection, thus further facilitating assembly and reducing size and costs while increasing durability and compactness. Moreover, as the terminal connector and the circuit board are automatically electrically connected (in a reversible manner) when being (reversibly) mechanically connected, the so provided coupling arrangement allows for an easy and simple direct connection of these components, while the additional terminals, i.e. in particular the first and the second terminal, still allow for a flexible electrical connection of different and preferably different types of external conductors. Furthermore, with the first and second connection structures the mechanical coupling of the terminal connector and the circuit board arrangement is stabilized and secured, so that in particular the terminal connector cannot be easily removed from the circuit board arrangement, so that the coupling is notably reliable, while the mechanical connection is still reversible to allow for an easy maintenance or replacement. Hence, also the electrical coupling is securely and reliably provided through the first and second electrical connection point in reversible manner.

The circuit board is preferably a circuit board of an LED driver or at least directly connected to such an LED driver, so that the herein provided coupling arrangement allows for a compact and comfortable coupling of the LED driver to external power and/or communication lines. It should be noted that electrical devices other than an LED driver are of course also suitable for coupling with the coupling arrangement. For the sake of simplicity, however, in the following the circuit board will be referred to as the circuit board of an LED driver.

Preferably, the connecting element comprises a connection housing for carrying the at least one first electrical connection point. With this embodiment the components of the connecting element are protected against accidental contact with the electrical components. Furthermore, the housing protects against external forces and at the same time stabilizes the connection of the first electrical connection point of each of the connecting units and the electrical connection point of each of the terminal connector units.

The first and second electrical connection point may form a pin connection, preferably a standardized pin connection. This facilitates the coupling of the terminal connector to the circuit board arrangement, thus further reducing costs.

The circuit board and/or the first electrical connection point and/or, if present, the connection housing may comprise the first connection structures. The housing and/or the second electrical connection point may comprise the second connection structures. With these configurations, a particularly stable mechanical coupling of the terminal connector and the circuit board arrangement is achieved, whereby the various connecting elements are particularly preferably each formed on the complementary component so that they easily interact with each other. Also, the mechanical connection can be realized at many different parts and regions, as desired, thus increasing the flexibility of the coupling arrangement.

Preferably, the first and second connection structures comprise complementary latching elements for reversible latching the terminal connector and the circuit board arrangement to form the mechanical connection. This latching connection of the first and second connection structures facilitates coupling of the two components (terminal connector and circuit board arrangement), whereby preferably allowing for an easily reversible decoupling and thus improving maintenance and flexibility of the coupling arrangement.

Preferably, the circuit board has a lateral recess delimited by at least two opposite side edges facing the recess, wherein the terminal connector is at least partially received in the recess between the side edges when connected to the circuit board arrangement. This configuration provides additional protection for the terminal connector and thus also for the connection between terminal connector and circuit board arrangement, since the positioning of the terminal connector in the recess means that the two lateral edges of the circuit board protect the terminal connector from lateral displacement or other external impact and thus provide additional stability. Preferably, the recess may have a lateral opening for receiving the terminal connector. Hence, the terminal connector can be easily received in the recess. Moreover, the recess may preferably be further delimited by an end side edge preferably arranged opposite to the lateral opening and connecting the side edges. This end side edge may function as stop to allow for a defined positioning of the terminal connector in the recess. The connecting element may preferably be arranged at the end side edge, which allows for an easy, secure and accurate relative positioning and thus connection of the terminal and the connecting element.

Preferably, the first and second connection structures may comprise complementary guide rail elements, such as guide surfaces formed by the side edges and lateral guide rails formed by the housing. The guide rail elements are designed to interact with each other in such a way that the terminal connector can be push-fit onto the circuit board arrangement at least partially along the connection direction, preferably into the recess via the lateral opening, and preferably thus mechanically connecting the terminal connector with the circuit board arrangement. With this configuration of the first and second connection structures, a particularly favourable, easy and secure coupling between the terminal connector and circuit board arrangement can be provided. Also, the terminal connector and the connecting element are connected in a defined manner thus reducing the risk of false assembly. Moreover, the terminal connector can be securely positioned and thus protected by the configuration of the circuit board if received in a recess of the circuit board. In this case, if the side edges of the recess form part of the guide rail elements, and/or the housing also forms part of the guide rail elements, these elements are easily provided in a cost-efficient but secure manner. Moreover, the electrical coupling can also be improved and secured by the mechanically guided contacting of the terminal connector and circuit board arrangement being push-fit onto each other.

Preferably, the first terminal has a first insertion direction and the second terminal has a second insertion direction for inserting the respective conductor, wherein preferably the first insertion direction and the second insertion direction are angled to each other, and furthermore preferred substantially perpendicular to each other. This allows for an easy electrical connection of different conductors as their insertion is not impeded by the other potential conductor. Also, different insertion directions may thus be provided as desired. Moreover, the first terminal may have a first conductor insertion channel and/or the second terminal may have a second conductor insertion channel, wherein preferably the housing forms at least part of the conductor insertion channels. With these characteristics, the connection of conductors with the terminal connector is facilitated, whereby the different directions improve flexibility. The housing provides stability and further eases the coupling of the respective conductors with the terminal connector, as the conductor insertion channels guide the to be connected conductor to a desired location for connection, namely the first or second conductor connection point.

Preferably, the first conductor connection point can be a clamping point. This allows for an easy and secure electrical connection of the first conductor, e.g. being a wire. The first terminal may preferably comprise a clamping contact member being moveable between a clamping position for clamping the first conductor at the clamping point for electrical connection, and a release position for allowing the first conductor be inserted into and removed from the clamping point. This layout can be easily provided and even allows an easy electrical connection, e.g., for flexible conductors as the first conductor. The first terminal may preferably comprise a release device for releasing or opening the clamping point, e.g. by moving the clamping contact member between the clamping position and the release position. This facilitates removal of the first conductors and, particularly for flexible conductors, also the insertion thereof. Preferably, the housing may comprise the release device, e.g. integrally. Hence, the release device can be accurately positioned and securely be supported. Also, the layout can be facilitated and number of parts be kept low. The clamping contact member may preferably be biased towards the clamping point or clamping position. This allows for securely maintaining the electrical connection. With these configurations, an easy and fast as well as secure coupling and decoupling of a respective first conductor to the terminal connector, in particular to the first terminal of a respective terminal connector unit, is provided. This furthermore facilitates the setup of the coupling arrangement and thus reduces costs.

Preferably, the second conductor connection point can be a pin connection point for selectively receiving the second conductor for electrical connection. This allows for a flexible and easy coupling of a respective second conductor with the terminal connector, and in particular with the second terminal of a respective terminal connector unit. Moreover preferred, the second terminal can be a plug terminal, which allows not only for an easy electrical coupling via the second conductor connection point, but preferably also for a mechanical connection of a plug housing of the respective second conductor and the housing of the terminal connector.

Preferably, the terminal connector can be a LINECT connector. The configuration of the terminal connector being a standardized, in particular a LINECT connector eases the assembly and reduces costs while enabling an utmost flexibility.

Preferably, the at least one connecting unit can be soldered to a corresponding soldering point of the circuit board and can thus be mechanically and electrically coupled to the circuit board. With the soldered connection between the at least one connecting unit to the circuit board an easy, durable and permanent coupling can be formed, while simultaneously providing mechanical and electrical linkage.

Preferably, the circuit board and the connecting element comprise complementary attachment structures for mechanically connecting the connecting element with the circuit board. This configuration with the complementary attachment structures provided by the circuit board and the connecting element, the stability of the coupling between these two components of the coupling arrangement is improved, whereby furthermore the contacting of the terminal connector and the circuit board arrangement is stabilized. The complementary attachment structures are preferably designed in such a way that a removal of one complementary attachment structure is not readily possible, and in particular preferably only by destroying the one complementary attachment structure. The mentioned mechanical connection can be a latching connection, which can be easily provided while allowing for a secure mechanical connection. The attachment structures can preferably be arranged laterally of the connecting element with respect to the connection direction. Hence, a mechanical connection can be provided without interfering with any elements, like circuit paths, for electrical connection.

Preferably, the connecting element may comprise a plurality of connecting units which are arranged side-by-side in a row and are oriented parallel to the connection direction. Hence, the terminal connector can be easily electrically coupled to the connecting element and misuse can be reduced. Preferably each of the connecting units comprises a connecting unit housing, so that the connecting units are securely protected, particularly if the connecting unit housing is made of an insulating material. These connecting unit housings can preferably be integrally formed to form the connection housing thus reducing parts and assembly. Hence, the handling of the connecting element during assembly and the production of the housing can be facilitated.

Preferably, the connecting element, more preferred the connection housing, may comprise dividing bars which are each arranged between the connecting units, and thus preferably between the connecting unit housings, for separating at least the first electrical connection points from each other. With this embodiment, the first electrical connection points of the connecting element are separated by one another, preventing unwanted and accidental contact, which may lead to a short circuit and/or risk for a user. Adding to that, with the housing and the dividing bars being preferably built from plastic or other insulating material, the electrical components of the connecting device are properly isolated, whereby the potential creeping distance of currents flowing through the first electrical connection points is further enlarged, improving safety of the coupling arrangement.

Further preferably the terminal connector may comprise a plurality of terminal connector units which are arranged side-by-side in a row and are oriented parallel to the connection direction. This implementation allows for multiple connection options for respective conductors to be electrically linked with components on the circuit board. Furthermore, the coupling of the terminal connector and the circuit board arrangement is facilitated, as multiple terminal connector units can be connected simultaneously to their respective counterparts on the circuit board arrangement.

Preferably, the number of the connecting units corresponds to the number of the terminal connector units wherein each connecting unit can be electrically connected via its first electrical connection point with one of the second electrical connection points and vice versa. With a matching number of connecting units and terminal connector units, the coupling arrangement is most efficiently used, allowing for as much as possible electrical contacting of the circuit board via the terminal connector. Alternatively, the number of terminal connector units can be smaller than the number of connecting units, such that not every first electrical connection point of the connecting element is coupled with a second electrical connection point of the terminal connector. In a further implementation it is even possible that multiple terminal connectors are coupled next to each other with the connecting element of the circuit board arrangement.

BRIEF DESCRIPTION OF THE DRAWINGS

The invention is explained in detail below with reference to examples of embodiments and with reference to the drawing. The figures show.

DETAILED DESCRIPTION OF THE PREFERRED EMBODIMENTS

Figure 1:
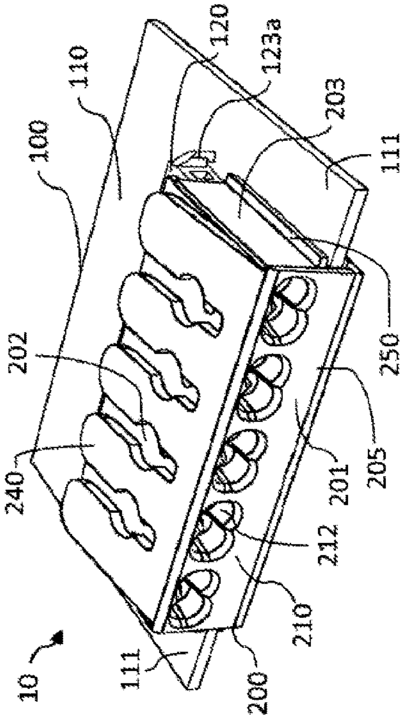
FIG. 1 is a perspective view of a coupling arrangement according to an embodiment of the present invention with a terminal connector being mechanically and electrically connected to the connecting element of the circuit board arrangement.

FIG. 1 shows a perspective view of a coupling arrangement 10 according to the present invention with a terminal connector 200 and a circuit board arrangement 100. The circuit board arrangement 100 comprises a circuit board 110 and a connecting element 120, which is connected mechanically to the circuit board 110. The terminal connector 200 is here preferably received in a lateral recess 112 of the circuit board 110, whereby the guide surfaces 111 of the circuit board 110 border the terminal connector 200 laterally, thus protecting it from lateral forces and preventing lateral movement of the terminal connector 200 in relation to the circuit board 110. Preferably at least parts of the terminal connector 200 conform to a standard, in particular according to the LINECT standard.

The circuit board 110 can be any type of circuit board, preferably a(n LED) driver circuit board or at least connected to such a(n LED) driver.

The connecting element 120 comprises at least one but preferably multiple connecting units 121 (in FIG. 5, for instance, five connecting units 121), wherein each connecting unit 121 comprises a first electrical connection point 124 being electrically connected to the circuit board 110. As shown, the connecting element 120 moreover preferably comprises a connection housing 126 for carrying the at least one electrical connection point 124, and which here preferably protectively surrounds the electrically conductive components 122 arranged inside the connecting element 120. These electrically conductive components 122 may, as exemplarily shown, form or comprise the first electrical connection point 124, whereby the conductive components

122 are here electrically connected with conductor paths on the circuit board 110, preferably via corresponding soldering points as contact points.

Figure 2:
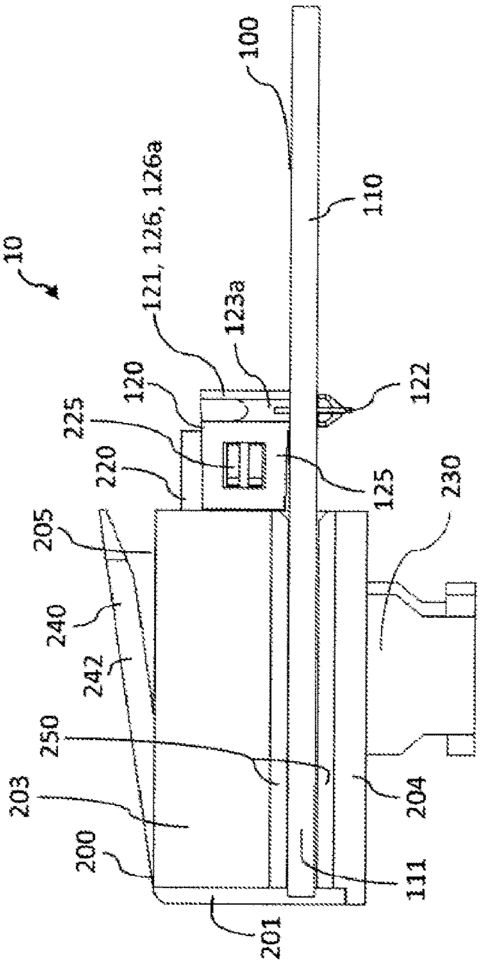
FIG. 2 is a side view of the coupling arrangement of FIG. 1.

The connection housing 126 may comprise at least one (here lateral) connection structure 125 for mechanically connecting with the terminal connector 200, as shown in FIG. 2. The connection housing 126 may further comprise at least one attachment structure 123*a* which mechanically interacts with a corresponding attachment structure 123*b* of the circuit board 110, whereby the corresponding attachment structure 123*b* is here exemplarily provided as a through hole, for example. The complementary attachment structures 123*a*, 123*b* can form a latching connection, whereby these complementary attachment structures 123*a*, 123*b* are here arranged laterally of the connecting element 120. Preferably, the at least one attachment structure 123*a* is positioned in proximity, and in particular adjacent, to the at least one lateral connection structure 125, to support the latching connection. Moreover, in the presented embodiment, each of the connecting units 121 has a connecting unit housing 126*a*, which is here preferably integrally formed to form the connection housing 126. Furthermore, the connection housing 126 comprises dividing bars 127, which are each arranged between the connecting unit housings 126*a*, for separating the first electrical connection points 124 from each other, as clearly shown in FIG. 5.

Figure 3:
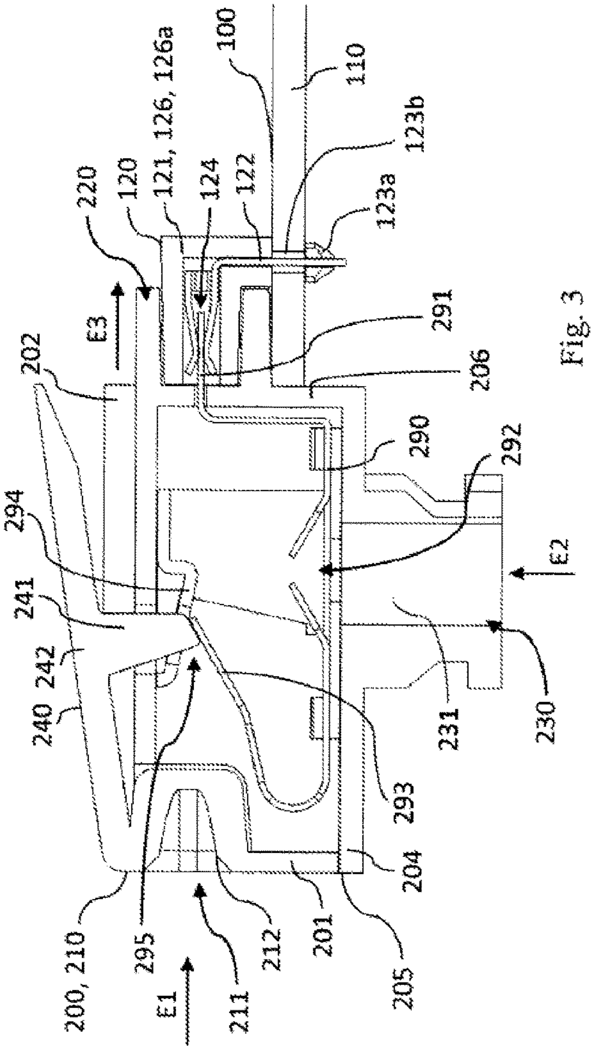
FIG. 3 is a cross-sectional side view of the coupling arrangement of FIG. 2, showing the components of the terminal connector and the circuit board arrangement.

As displayed in FIGS. 1 to 3, the terminal connector 200 comprises at least one terminal connector unit 210 and a housing 205 for carrying the at least one terminal connector unit 210. Moreover, each terminal connector unit 210 comprises a first terminal 211 having a first conductor connection point 295 for electrically connecting a first (external) conductor; a second terminal 230 having a second conductor connection point 292 for electrically connecting a second (external) conductor; and a third terminal 220 being electrically connected to the first and second terminal 211, 230, wherein the third terminal 220 comprises a second electrical connection point 291 designed for being electrically connectable to the at least one first electrical connection point 124 in a connection direction E3. As shown in FIG. 1, the terminal connector 200 comprises a plurality of terminal connector units 210 which are arranged side-by-side in a row and are oriented parallel to the connection direction E3.

As shown in FIG. 3, the housing 205 of the terminal connector 200, and thus of each terminal connector unit 210, comprises a front side 201, which features a first conductor insertion channel 212 of the first terminal 211, and a bottom side 204 which integrally forms at least a part of a second conductor insertion channel 231 of the second terminal 230. Here at the top of each of the terminal connector units 210, a release device 240 can be positioned at the top side 202 of the terminal connector 200. Each of the third terminals 220 of the terminal connector units 210 is here positioned at a back side 206 of the terminal connector 200, whereby the back side 206 is arranged opposite to the front side 201, with the top and bottom sides 202, 204 connecting the front side 201 with the back side 206. As shown in FIG. 3, the third terminals 220 protrude from the back side 206 of the terminal connector 220, forming a complementary structure to part of the connection housing 126, and in particular to part of the connecting unit housings 126*a* of the connector units 210, providing fitment and thus stability of the coupling between the terminal connector 200 and the circuit board arrangement 100.

In the displayed embodiment of FIG. 2, the circuit board arrangement 100 comprises first connection structures 111, 125 (e.g. including the already mentioned lateral connection structure 125) and the terminal connector 200 comprises complementary second connection structures 225, 250 for a reversible mechanical connection of the circuit board arrangement 100 and the terminal connector 200. As exemplarily shown, the first and second connection structures 111, 125, 225, 250 may comprise complementary guide rail elements 111, 250, such as guide surfaces 111 formed by side edges 111*a*, 111*b* of the circuit board 110 and lateral guide rails 250 formed by the housing 205, and may further comprise complementary latching elements 125, 225.

In the shown embodiment, the first connection structures 111, 125 are formed by the guide surfaces 111 of the circuit board 110 and at least one latching element 125, which are part of the connecting element 120. The second connection structures 225, 250 are here formed by at least one respective opposite latching element 225 and by the lateral guide rails 250. In particular in this embodiment the second connection structures 225, 250 are part of the housing 205 of the terminal connector 200.

The lateral guide rails 250 are preferably designed to interact with the guide surfaces 111 in such a way that the terminal connector 200 can be push-fit onto the circuit board arrangement 100 at least partially along the connection direction E3, preferably into the recess 112 via a lateral opening 113, and preferably thus mechanically connecting the terminal connector 200 with the circuit board arrangement 100. This guide rail connection 111, 250 and the connection of the complementary latching elements 125, 225 hold the terminal connector 200 in place ensuring a stable and durable mechanical connection of the components of the coupling arrangement 10.

Of course, other connection structures of the circuit board arrangement 100 and the terminal connector 200 are also possible, whereby exemplary the connection housing 126 and/or the first electrical connection point 124 could comprise the first connection structures 125, and whereby likewise the second electrical connection point 291 could comprise the second connection structures. Furthermore, the connecting element 120 could also comprise just one attachment structure 123*a* which is connected centrally to the connection housing 126.

In the mechanical connection state of the circuit board arrangement 100 and the terminal connector 200, the first and second terminals 211, 230 are electrically connected to the circuit board 110 through the first and second electrical connection point 124, 291. Therefore, the first, second conductor connection point 295, 292 and the second electrical connection point 291 of each terminal connector unit 210 are preferably integrally connected via or formed by an electrical conductor 290, which is held fixed inside the respective terminal connector unit 210 and thus inside the housing 205. Via the first and second electrical connection point 124, 291 the terminal connector 200 is electrically connected, e.g., to conductor paths and other electrical components of the circuit board 110, such as LED drivers or the like.

As shown in FIG. 2, the first terminal 211 may have a first insertion direction E1 and the second terminal 230 may have a second insertion direction E2 for inserting the respective conductor. Preferably, the first and the second insertion directions E1, E2 may be angled to each other, and furthermore preferred substantially perpendicular to each other as shown in FIG. 2. The first conductor insertion channel 212 of the first terminal 211 is configured to lead a respective first conductor towards the first conductor connection point 295.

As shown in FIG. 3, the first conductor connection point 295 can be a clamping point 295, and the first terminal 211 can be a clamping terminal 211. Therefore, the first terminal 211 preferably comprises a clamping contact member 293 being moveable between a clamping position for clamping the first conductor at the clamping point 295 for an electrical connection (see FIG. 3), and a release position for allowing the first conductor to be inserted into and removed from the clamping point 295. The first terminal 211 may comprise the mentioned release device 240 for moving the clamping contact member 293 between the clamping position and the release position. The release device 240 here comprises a lever 242 and a press-element 241, whereby preferably the lever 242 and the press-element 241 are integrally formed and further integrally connected to the housing 205. The press-element 241 protrudes into the inside of the respective terminal connector unit 210, and is furthermore in contact with the clamping contact member 293.

Preferably, the first terminal 211 may further comprise a support member 294, wherein the clamping contact member 293—in the state in which no first conductor is present in the first terminal 211—is in contact with the support member 294. Preferably, the support member 294 has an inclined contact surface for simplified insertion and contacting of the respective first conductor. Here, together with the clamping contact member 293, these two sections may form (part of) the first conductor insertion channel 212. The support member 294 may be made of electrical conduction material and be preferably connected to the electrical conductor 290 or the second electrical connection point 291. Further preferred, the clamping contact member 293 can be biased towards the clamping point or clamping position (here against support member 294), as shown in FIG. 3, allowing for maintaining a secure electrical contact of the respective first conductor.

Upon actuation of the lever 242, i.e. by pushing the lever 242 down towards the top side 202 of the housing 205, the press-element 241 pushes the clamping contact member 293 down, forming a gap between the clamping contact member 293 and the housing 205, and in particular a gap between the clamping contact member 293 and the support member 294. This state allows the first conductor even in form of a flexible conductor to be inserted into and in any case also removed from the clamping point 295, and thus builds the release position. In the clamping position, the lever 242 is not actuated whereby the clamping contact member 293 pushes the respective first conductor against the top side 202 and/or in particular against the support member 294, as shown in FIG. 3.

The second conductor connection point 292 can be a pin connection point for selectively receiving the second conductor for electrical connection, whereby the second terminal 230 can be a plug terminal 230, as shown in FIGS. 2 and 3. As the first conductor insertion channel 212, the second conductor insertion channel 231 is at least partially formed by the housing 205. The second conductor insertion channel 231 is configured to lead a respective second conductor towards the conductor connection point 292 for an electrical connection therewith. Moreover, a plug element of the second terminal 230 of a respective terminal connector unit 210 is preferably integrally formed with the housing 205, for providing a steady mechanical connection between a plug of the second conductor and the housing 205, which also facilitates and stabilizes the electrical connection.

With the first and second terminal 211, 230, the terminal connector 200 provides the function to connect two conductors to each terminal connector unit 210 from different directions E1, E2 at the same time. In case of different types of first and second terminal—e.g. clamping terminal and plug terminal—the terminal connector 200 can be provided to conform to LINECT standard. Through the third terminal 220, which is connected to the connecting unit 121 of the circuit board arrangement 100, the respective conductors and the respective circuit board 110 can be electrically linked.

Further displayed in FIG. 3, the connecting element 120 respectively the at least one connecting unit 121 has the first electrical connection point 124 which is at least electrically connected to the circuit board 110. Therefore, the at least one connecting unit 121 can be soldered to a corresponding soldering point of the circuit board 110 and is thus mechanically and electrically coupled to the circuit board 110. In particular, each of the first electrical connection points 124 and thus the respective pins 122 can be soldered to the circuit board 110 forming an electrically and mechanically coupling of each of the connecting units 121—and thus the connecting element 120—and the circuit board 110. The electrical connection between the connecting element 120 and the circuit board 110 may be established in various ways, whereby for example it is conceivable that corresponding through-holes are present in the circuit board 110, whereby the pins 122 are inserted through these through-holes and are thus soldered on the rear side of the circuit board 110, whereby the rear side of the circuit board 110 is opposite to the side on which the connecting element 120 is arranged. The displayed embodiment comprises this form of electrical connection as can be seen in particular in FIGS. 2 and 4. Furthermore, it is conceivable that the pins 122 are soldered on the upper side of the circuit board 110, whereby the upper side is the side on which the connecting element 120 is arranged. Other electrical connections are also conceivable, such as a plugged-on coupling or the like. However, the soldered connection represents a particularly stable electrical and mechanical coupling.

As can be seen in FIG. 3, the first and second electrical connection point 124, 291 preferably form a standardized pin connection, ensuring a steady electrical coupling between each of the terminal connector units 210 and the respective connecting units 121.

Figure 4:
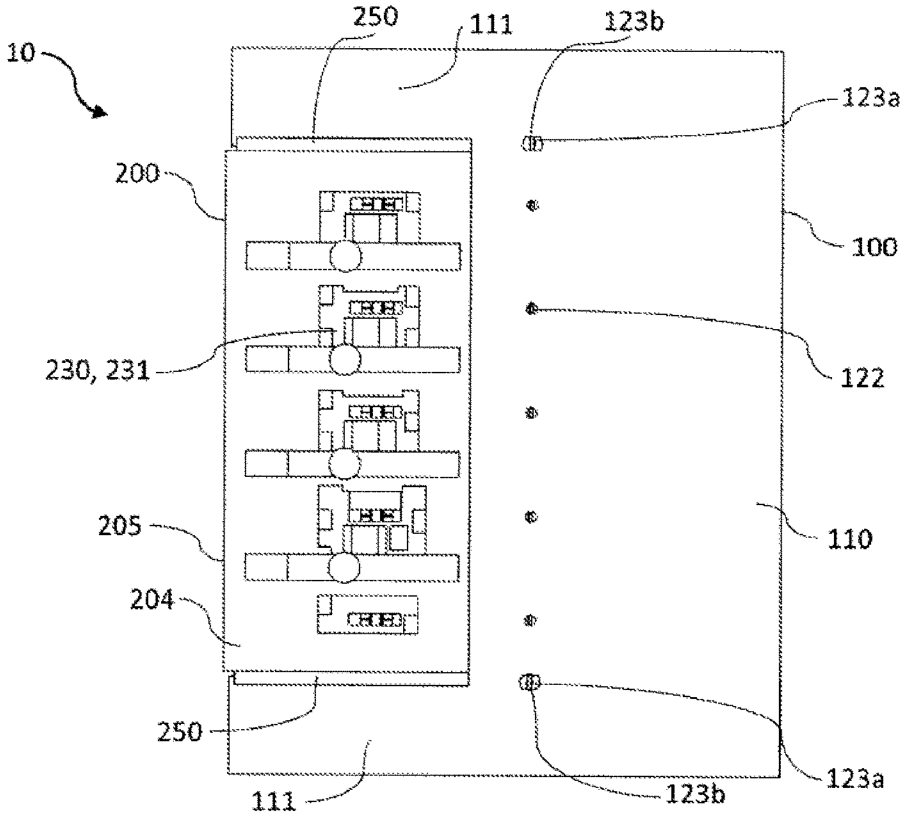
FIG. 4 is a bottom view of the coupling arrangement of FIG. 1.

FIG. 4 shows the pins 122 of the connecting units 121 being soldered at the rear side of the circuit board 110, whereby the complementary attachment structures 123*a*, 123*b* for mechanically connecting the connecting element 120 with the circuit board 110 are positioned lateral to the pins 122—and thus are arranged laterally of the connecting element 120 with respect to the connection direction E3. Moreover, the guide surfaces 111 border the terminal connector 200 laterally, whereby the terminal connector 200 is placed in the recess 112 of the circuit board 110 and thus mechanically and electrically coupled to the circuit board arrangement 100. The lateral guide rails 250 of the housing 205 of the terminal connector 200 and the guide surfaces 111 of the circuit board 110 preferably hinder a horizontal and vertical displacement of the terminal connector 200 in relation to the circuit board arrangement 100, so that in particular a displacement of the terminal connector 200 which does not correspond to the insertion direction E3 is prevented. The guide rail connection may also be a press-fit connection, thus even preventing a displacement along the insertion direction E3. This ensures a stable mechanical and electrical connection and further facilitates the setup of the coupling arrangement 10. The second terminals 230 of the terminal connector units 210 and the respective second conductor insertion channels 231 are positioned at the bottom side 204 of the terminal connector 200, whereby in FIG. 4 an embodiment for such plug elements of the plug terminal 230 is shown.

Figure 5:
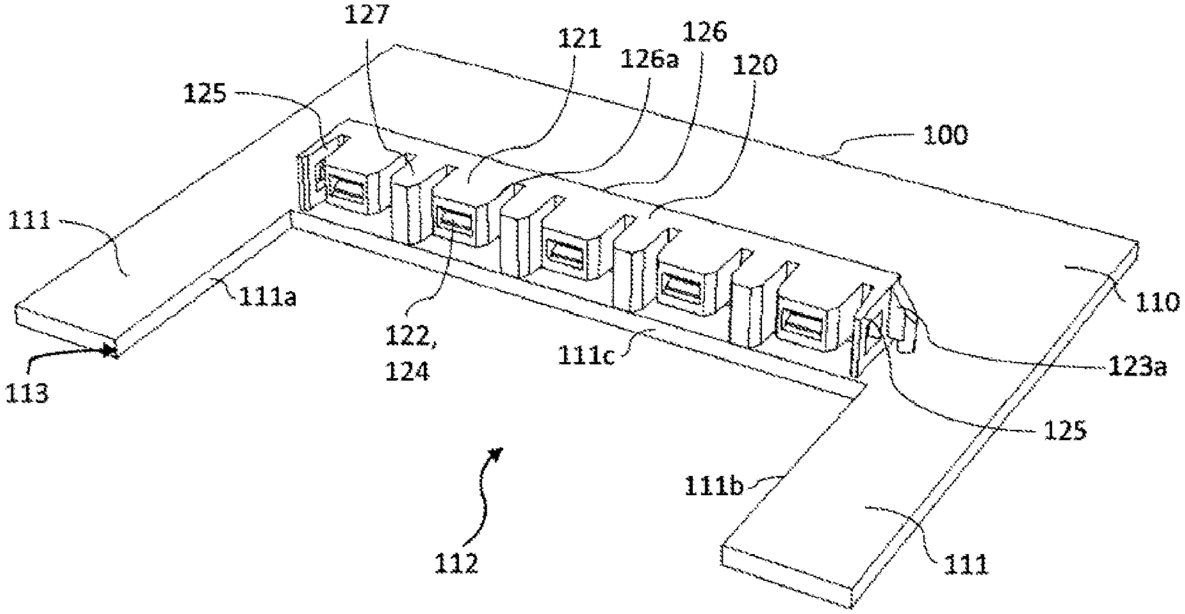
FIG. 5 is a perspective view of the circuit board arrangement of FIG. 1.

In FIG. 5, the lateral recess 112 is displayed, whereby the recess 112 is delimited by at least two opposite side edges 111*a*, 111*b* of the circuit board 110 facing the recess 112. In synopsis in particular with FIGS. 1 and 4 it is clear that in the displayed embodiment of the coupling arrangement 10, the terminal connector 200 is at least partially received in this recess 112 between the side edges 111*a*, 111*b* when connected to the circuit board arrangement 100, whereby the recess 112 has a lateral opening 113 for receiving the terminal connector 200. Moreover, the recess 112 may further be delimited by an end side edge 111*c* preferably arranged opposite to the lateral opening 113 and connecting the side edges 111*a*, 111*b*, wherein the connecting element 120 is preferably arranged at the end side edge 111*c*. Moreover, in alternative embodiments, the recess 112 of the circuit board 110 could be formed such, that only one guide surface 111 is present, protecting the terminal connector 200 only from one side and similarly providing only one side edge 111*a*, 111*b* for interacting with a guide rail 250 of the terminal connector 200, while improving flexibility of the assembly of the coupling arrangement 10. However, other forms of recesses 112 and guide surfaces 111 are also possible.

The shown embodiment of the connecting element 120 comprises a plurality of connecting units 121 which are arranged side-by-side in a row and are oriented parallel to the connection direction E3. Therefore, each of the connecting units 121 comprises a connecting unit housing 126*a*. The displayed connecting element 120 thus comprises multiple connecting unit housings 126*a* with dividing bars 127 between two connecting unit housings 126*a* forming the connection housing 126. Moreover, laterally connected, and preferably integrally formed, with the connection housing 126 can be latching elements 125 for mechanically coupling with the terminal connector 200, and attachment structures 123*a* for mechanically coupling with the circuit board 110. Moreover, each connecting unit 121 may comprise the first electrical connection point 124 formed by electrically conductive components 122 to electrically connect to the circuit board 110 and the second electrical connection point 291 of a terminal connector unit 210.

As shown in FIG. 1, the number of the connecting units 121 corresponds to the number of the terminal connector units 210, wherein each connecting unit 121 can be electrically connected via its first electrical connection point 124 with one of the second electrical connection points 291 and vice versa. This allows for a maximum number of contactable conductor paths of the circuit board 110 by contacting the respective terminals 211, 230 of the terminal connector 200. Of course, other implementations are also possible, whereby in particular the number of terminal connector units 210 may be identical or smaller than the number of connecting units 121.

The coupling arrangement 10 provides a flexible and simple coupling of external conductors with a circuit board 110. Therefore, a terminal connector 200 can be directly and reversibly connected mechanically and electrically to the circuit board arrangement 100 via the connecting element 120. Thereby, the terminal connector 200 is easily made reversibly integral with the circuit board arrangement 100, thus facilitating the assembly of an electrical device where the presented coupling arrangement 10 is used. Moreover, no additional wirings or additional connection boxes are necessary to connect the circuit board 110 with the respective conductors, and therefore needs less space particularly when implementing a terminal connector to conform a desired standard, like LINECT. Thus, the coupling arrangement 10 reduces costs, material consumption, space consumption and further improves flexibility and maintenance.

The present invention is not limited by the embodiment as described herein as long as being covered by the appended claims.

The invention claimed is:

1. A coupling arrangement (10) for reversibly mechanically and electrically coupling a terminal connector (200) to a circuit board arrangement (100), the circuit board arrangement (100) comprising a circuit board (110); and a connecting element (120) being mechanically connected to the circuit board (110), wherein the connecting element (120) comprises at least one connecting unit (121), wherein each connecting unit (121) of the at least one connecting unit comprises a first electrical connection point (124) being electrically connected to the circuit board (110); and the terminal connector (200) comprising at least one terminal connector unit (210) and a housing (205) for carrying the at least one terminal connector unit (210), wherein each terminal connector unit (210) comprises:

a first terminal (211) having a first conductor connection point (295) for electrically connecting a first conductor;

a second terminal (230) having a second conductor connection point (292) for electrically connecting a second conductor; and a third terminal (220) being electrically connected to the first and second terminal (211, 230), wherein the third terminal (220) comprises a second electrical connection point (291) designed for being electrically connectable to said first electrical connection point (124) in a connection direction (E3);

wherein the circuit board arrangement (100) comprises first connection structures and the terminal connector (200) comprises complementary second connection structures for a reversible mechanical connection of the circuit board arrangement (100) and the terminal connector (200), wherein, in the mechanical connection state, the first and second terminals (211, 230) are electrically connected to the circuit board (110) through the first and second electrical connection point (124, 291).

2. The coupling arrangement according to claim 1, wherein the connecting element (120) comprises a connection housing (126) for carrying the at least one first electrical connection point (124), and wherein the first and second electrical connection point (124, 291) form a pin connection.

3. The coupling arrangement according to claim 2, wherein the circuit board (110), the first electrical connection point (124), and the connection housing (126) comprise(s) the first connection structures (111, 125), and that the housing (205) and the second electrical connection point (291) comprise(s) the second connection structures (225, 250).

4. The coupling arrangement according to claim 1, wherein the first and second connection structures comprise complementary latching elements (125, 225) for latching the terminal connector (200) and the circuit board arrangement (100) to form the mechanical connection.

5. The coupling arrangement according to claim 1, wherein the circuit board (110) has a lateral recess (112) delimited by at least two opposite side edges (111*a*, 111*b*) facing the recess (112), wherein the terminal connector (200) is at least partially received in the recess (112) between the side edges (111*a*, 111*b*) when connected to the circuit board arrangement (100), wherein the recess (112) has a lateral opening for receiving the terminal connector (200).

6. The coupling arrangement according to claim 1, wherein the first and second connection structures comprise complementary guide rail elements (111, 250), such as guide surfaces (111) formed by the side edges (111*a*, 111*b*) and lateral guide rails (250) formed by the housing (205), wherein the lateral guide rail elements (111, 250) are designed to interact with each other in such a way that the terminal connector (200) can be push-fit onto the circuit board arrangement (100) at least partially along the connection direction (E3), into a recess (112) via the lateral opening, and thus mechanically connecting the terminal connector (200) with the circuit board arrangement (100).

7. The coupling arrangement according to claim 1, wherein the first terminal (211) has a first insertion direction (E1) and the second terminal (230) has a second insertion direction (E2) for inserting the respective conductor, wherein the first and the second insertion directions (E1, E2) are angled to each other, and furthermore substantially perpendicular to each other, wherein the first terminal (211) has a first conductor insertion channel (212) and the second terminal (230) has a second conductor insertion channel (231), and the housing (205) forms at least part of the conductor insertion channels (212, 231).

8. The coupling arrangement according to claim 1, wherein the first conductor connection point (295) is a clamping point, wherein the first terminal (211) comprises a clamping contact member (293) being moveable between a clamping position for clamping the first conductor at the clamping point for electrical connection, and a release position for allowing the first conductor to be inserted into and removed from the clamping point, wherein the first terminal (211) comprises a release device (240) for moving the clamping contact member (293) between the clamping position and the release position, wherein the housing (205) comprises the release device (240), and wherein the clamping contact member (293) is biased towards the clamping point or clamping position.

9. The coupling arrangement according to claim 1, wherein the second conductor connection point (292) is a pin connection point for selectively receiving the second conductor for electrical connection.

10. The coupling arrangement according to claim 1, wherein the terminal connector (200) is a LINECT connector.

11. The coupling arrangement according to claim 1, wherein the at least one connecting unit (121) is soldered to a corresponding soldering point of the circuit board (110) and is thus mechanically and electrically coupled to the circuit board (110).

12. The coupling arrangement according to claim 1, wherein the circuit board (110) and the connecting element (120) comprise complementary attachment structures (123*a*, 123*b*) for mechanically connecting the connecting element (120) with the circuit board (110), wherein the attachment structures (123*a*, 123*b*) are arranged laterally of the connecting element (120) with respect to the connection direction (E3).

13. The coupling arrangement according to claim 1, wherein the at least one connecting element (120) comprises a plurality of connecting units (121) which are arranged side-by-side in a row and are oriented parallel to the connection direction (E3), wherein each of the connecting units (121) comprises a connecting unit housing (126*a*), which are integrally formed to form the connection housing (126), wherein the connecting element (120) comprises dividing bars (127) which are each arranged between the connecting units (121), and thus between the connecting unit housings (126*a*), for separating at least the first electrical connection points (124) from each other.

14. The coupling arrangement according to claim 1, wherein the terminal connector (200) comprises a plurality of terminal connector units (210) which are arranged side-by-side in a row and are oriented parallel to the connection direction (E3).

15. The coupling arrangement according to claim 1, wherein the number of the connecting units (121) corresponds to the number of the terminal connector units (210), wherein each connecting unit (121) can be electrically connected via its first electrical connection point (124) with one of the second electrical connection points (291) and vice versa.

16. The coupling arrangement according to claim 1, wherein the circuit board (110) has a lateral recess (112) delimited by at least two opposite side edges (111*a*, 111*b*) facing the recess (112), wherein the recess (112) is further delimited by an end side edge (111*c*) arranged opposite to the lateral opening and connecting the side edges (111*a*, 111*b*), wherein the connecting element (120) is arranged at the end side edge (111*c*).

* * * * *